United States Patent [19]

English

[11] 4,222,180
[45] Sep. 16, 1980

[54] VISUAL TEACHING DEVICE

[76] Inventor: Anthony E. English, 19312 S. Gunlock Ave., Carson, Calif. 90746

[21] Appl. No.: 34,574

[22] Filed: Apr. 30, 1979

[51] Int. Cl.³ .......................................... G09B 27/00
[52] U.S. Cl. ...................................... 35/43; 35/49; 272/8 N
[58] Field of Search ................... 35/19 R, 19 B, 22 A, 35/43, 49; 272/8 N; 273/145 A, DIG. 24; 350/276 R, 276 SL, 319

[56] References Cited

U.S. PATENT DOCUMENTS

| 1,727,483 | 10/1929 | Moszelt | 273/145 A |
| 4,073,529 | 2/1978 | Ostrin | 273/DIG. 24 X |
| 4,123,591 | 10/1978 | Karki | 350/276 SL X |

Primary Examiner—Harland S. Skogquist
Attorney, Agent, or Firm—I. Michael Bak-Boychuk

[57] ABSTRACT

Disclosed herein is a device conformed as a cylindrical structure having a bore axially bending partly therethrough, the end surface around the bore being coated with a phosphorescent coating and the bore surfaces being coated with black paint. By virtue of these coatings and the relative reflection coefficient thereof, a substantially true visual impression is created duplicating the appearance of a black hole in space. Thus the device may be used as a teaching aid assisting the user in the visualization of a complex physical phenomenon.

3 Claims, 4 Drawing Figures

FIG. 1
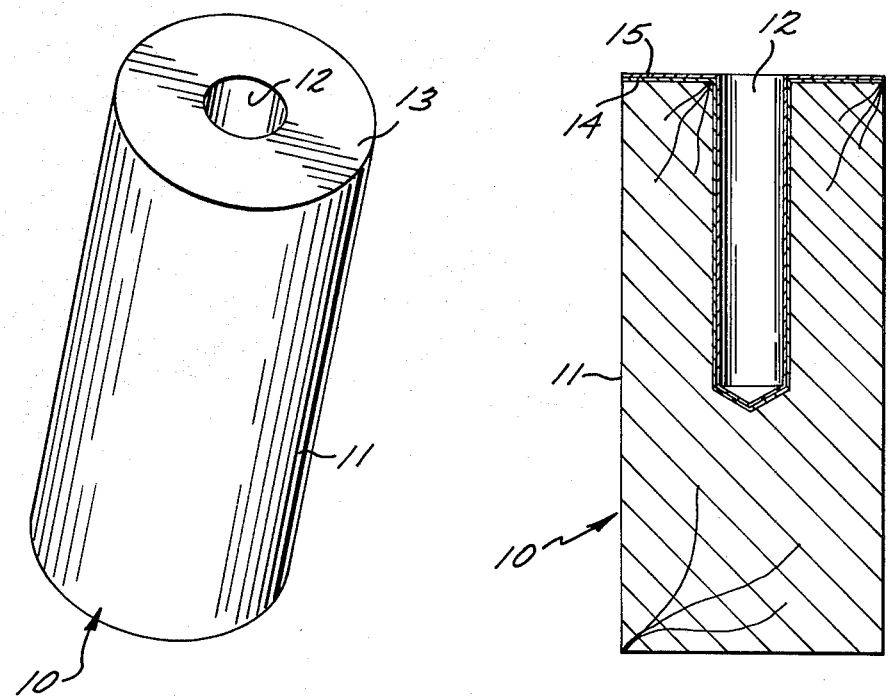
FIG. 2
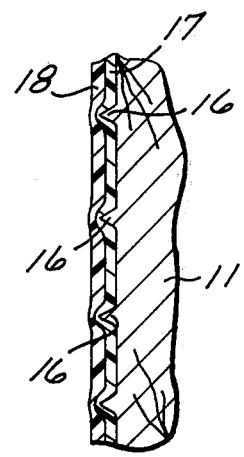
FIG. 4
FIG. 3
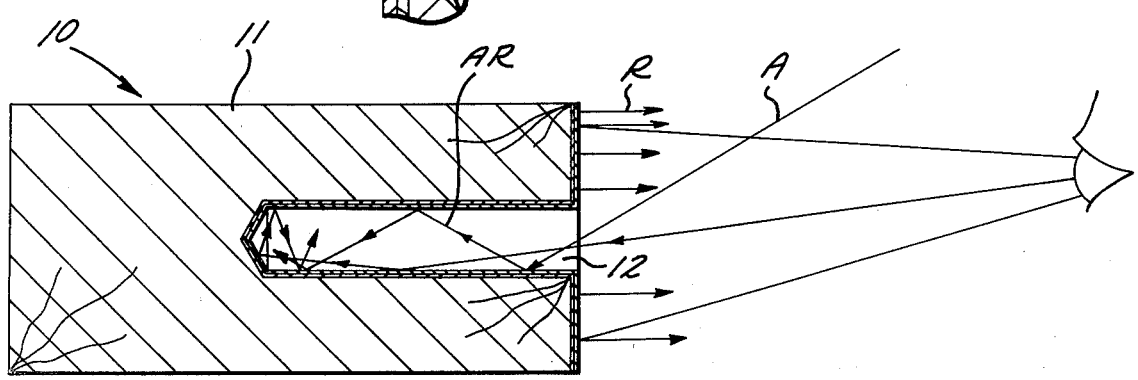

VISUAL TEACHING DEVICE

BACKGROUND OF THE INVENTION

1. Field of the Invention

The present invention relates to teaching aids, and more particularly to visual aids which by virtue of their structure and coatings simulate the appearance of perfectly black physical bodies.

2. Description of the Prior Art

The existence of what is now called as "black holes in space" has been recently discovered. Both concurrent and prior to this discovery the phenomena entailed in describing the black hole involved complex physical principles and thus render visualization thereof difficult to a lay person. Thus the explanation of the general aspects of a perfectly black receptical like the black hole is rendered quite difficult particularly when the explanation is directed to people not schooled in the many disciplines necessary to understand same. As in many other instances difficult subjects may be taught by visual examples without the necessary recourse to the specific physical concepts involved. Thus the person observing the example may be exposed to the existence of the phenomenon without necessarily comprehending all of the detail physics thereof. It is this technique that is most frequently used at the basic educational levels with some success.

Visual examples of perfect black bodies have heretofore been difficult to produce. One particular problem area is the necessity for a large reflective contrast between the black body image and the surrounding background since under all circumstances the characteristics of a pure black receptacle are impossible to produce. Additionally, the changes im ambient light surrounding the visual aid also effect the image contrast with the result that the present-day teaching aids lack the necessary fidelity to effectively present the phenomenon of a pure black receptacle.

SUMMARY OF THE INVENTION

Accordingly, it is the general purpose and object of the present invention to provide a visual aid for producing a visual image of a black body which, by virtue of its structure reduces the level of reflected light below the threshhold of a human eye.

Other objects of the invention are to provide a visual aid for simmulating a radiation sink which is easy to produce and convenient in use.

Yet additional objects of the invention are to provide a visual aid for simmulating black bodies which will maintain simmulation fidelity under most ambient light conditions.

Briefly these and other objects are accomplished within the present invention by providing a cylindrical segment which includes an axial bore extending partly therethrough, one end of the bore being exposed to view at the end of the segment, the adjacent surfaces of the segment end being coated with a phosphorescent coating. The interior of the bore is furthermore coated with a black primer which is then coated with a blacker coat, the foregoing combination smoothing over any microscopic irregularities in the bore surface and thereby reducing surface reflections which may reradiate or reflect light out of the bore. By virtue of this combination the phosphorescent edge surface provides the requisite contrast against which the substantially reflection-free bore is exposed, thus producing the visual image of a perfectly black receptacle.

It is to be understood that the discrimination of a human eye is less than perfect and under conditions where a substantially large contrast exists threshhold reflections will not be discriminated. Thus by associating a phosphorescent background with a bore in which most of the reflective surfaces have been smoothed over, what appears to be a perfectly black body is visually created which then may be used to explain a complex phenomena.

BRIEF DESCRIPTION OF THE DRAWINGS

FIG. 1 is a perspective illustration of a visual aid device constructed according to the present invention;

FIG. 2 is a side view in section of the device shown in FIG. 1 illustrating the configuration and coatings thereof;

FIG. 3 is yet another side view of the device shown in FIG. 1, once more in section, illustrating the light patterns incident therewith; and FIG. 4 is a detail sectional view of the device shown in FIG. 1 illustrating the coatings utilized in order to reduce reflective surfaces.

DESCRIPTION OF THE SPECIFIC EMBODIMENT

As shown in FIGS. 1–4 the inventive visual aid device, generally designated by the numeral 10, comprises a section of a cylinder 11 provided with an axial bore 12 partly extending into the interior thereof. In this form segment 11 will include a viewing end 13 having exposed at the center thereof the end of bore 12. The surface of the viewing end 13 includes a surface coating achieved by way of a white base coat 14 covered by a phosphorescent layer 15. This combination of coatings produces a light radiating surface which, by virtue of the phosphorescent action of coating 15, will produce radiated light R around the end of bore 12. This radiated light R will enhance the contrast with the bore interior, the contrast being further supplemented by a black coating of the bore interior. More specifically as shown in FIG. 4 bore 12 may be formed in any conventional manner and will thus include in the surfaces thereof the necessary microscopic irregularities 16 which will always be found in the course of casting or machining. These surface irregularities have heretofore presented reflected surfaces by which ambient light A will be reflected back out of the bore. To preclude these reflections the irregularities 16 are first coated with black primer 17 which is then covered by a lacquer coat 18 resulting in a smooth surface which greatly attenuates any reflective surface irregularites. With this smooth surface the ambient light A entering the interior of bore 12 will remain in the bore in the course of reflection as reflected light AR until fully absorbed.

In this manner imperfect coatings and shape may be used to produce what appears to be a perfect black light receptacle giving the necessary visual impression to aid in the understanding of a complex phenomenon.

In use the device 10 may be held with the end surface 13 thereof exposed to view of a user, the eye of the user then receiving the radiated light R generated at the phosphorescent layer 15 and the virtually black interior of bore 12. The relative contrast and the lack of reflection out of the bore interior provides the necessary light separation under most ambient conditions to produce the image of a black body.

Obviously many modifications and changes can be made without departing from the spirit of the invention. It is therefore intended that the scope of the invention be determined solely on the claims appended hereto.

What is claimed is:

1. Apparatus for simmulating the visual perception of a black body comprising:
   a cylindrical housing having an axially aligned bore extending partly from one end thereof, said bore including a first layer of black coating on the surfaces thereof and a second layer of black smoothing coating on said first layer and said one end including a coating of phosphorescent paint.

2. Apparatus according to claim 1 wherein:
   said housing in conformed of a solid structure like wood.

3. Apparatus according to claim 2 wherein:
   said bore is dimensioned to absorb substantially all light beams directed into the interior thereof.

* * * * *